United States Patent [19]

Kamiguchi et al.

[11] Patent Number: 5,045,253
[45] Date of Patent: Sep. 3, 1991

[54] AUTOMATIC MOLD THICKNESS ADJUSTING METHOD FOR A TOGGLE-TYPE MOLD CLAMPING APPARATUS

[75] Inventors: Masao Kamiguchi; Masato Yamamura; Yuichi Hosoyo; Minoru Kobayashi; Shuichi Wakebe, all of Yamanashi, Japan

[73] Assignee: Fanuc Ltd, Minamitsuru, Japan

[21] Appl. No.: 432,765

[22] PCT Filed: Apr. 17, 1989

[86] PCT No.: PCT/JP89/00411
§ 371 Date: Oct. 26, 1989
§ 102(e) Date: Oct. 26, 1989

[87] PCT Pub. No.: WO89/10250
PCT Pub. Date: Nov. 2, 1989

[30] Foreign Application Priority Data

Apr. 27, 1988 [JP] Japan .............................. 63-102395

[51] Int. Cl.⁵ ..................... B29C 45/64; B29C 45/80
[52] U.S. Cl. ............................. 264/40.5; 264/328.1; 425/150; 425/593
[58] Field of Search ..................... 264/40.5, 328.1; 425/592, 593, 451.5, 451.6, 150

[56] References Cited

U.S. PATENT DOCUMENTS 4,695,238 9/1987 Taniguchi .......................... 425/593

FOREIGN PATENT DOCUMENTS 62-220314 9/1987 Japan .

Primary Examiner—Jill L. Heitbrink
Attorney, Agent, or Firm—Staas & Halsey

[57] ABSTRACT

An automatic mold thickness adjusting method is provided, which is capable of effecting mold thickness adjustment in a short time by a low-cost mold clamping apparatus using a general-purpose motor for mold thickness adjustment, and of preventing an overcurrent from flowing in the motor. A crosshead is retreated to a position behind a position (LO) for production of a set mold clamping force when the crosshead reaches a lock-up position before a die-touch state is attained, or when the die-touch state is established in a crosshead position before the aforesaid position (LO), and a rear platen is advanced so that the die-touch state is attained. Thereafter, the motor for mold thickness adjustment is driven in a direction to retreat the rear platen, and at the same time, a servomotor is driven in a direction to advance a movable platen, at a speed equal to the retreating speed of the rear platen obtained by multiplying a program-specified speed by an override value corresponding to a crosshead shift position, thereby causing the crosshead to reach the aforesaid position (LO).

4 Claims, 4 Drawing Sheets

AUTOMATIC MOLD THICKNESS ADJUSTING METHOD FOR A TOGGLE-TYPE MOLD CLAMPING APPARATUS

BACKGROUND OF THE INVENTION

The present invention relates to an automatic mold thickness adjusting method for a toggle-type mold clamping apparatus of, e.g., an injection-molding machine, and more particularly, to an automatic mold thickness adjusting method capable of speedy mold thickness adjustment using a low-priced mold clamping apparatus.

A toggle-type mold clamping apparatus attached to an injection-molding machine typically comprises a toggle mechanism, which includes toggle links formed of link members connected individually to a rear platen and a movable platen and also to each other. The toggle mechanism is driven by a motor to establish a lockup state in which the toggle links stretch to their full length, whereby tie bars, opposite ends of which are connected individually to the front stationary platen and the rear platen, are stretched to produce a mold clamping force. In replacing a die, moreover, a motor for mold thickness adjustment is driven to adjust automatically the position of the rear platen, i.e., to effect a mold thickness adjustment in accordance with the thickness of the die and a required mold clamping force.

Conventionally, mold clamping apparatuses are known which use servomotors for both the motor for the toggle mechanism and the motor for mold thickness adjustment (refer to Japanese Patent Disclosure Nos. 61-71164, 61-220819, and 61-249729). Using the expensive servomotors, however, the apparatuses of this type entail high costs.

Accordingly, there is a proposal that the costs of a mold clamping apparatus be lowered by using a general-purpose motor, such as an induction motor, as the motor for mold thickness adjustment (refer to Japanese Patent Disclosure No. 62-220314). In the mold clamping apparatus according to this proposal, if a die-touch state, in which one die half attached to a movable platen engages the other die half attached to a front stationary platen, is attained before toggle links stretch to their full length, during the drive of a motor for a toggle mechanism for mold thickness adjustment, the motor for mold thickness adjustment is driven to cause a rear platen to retreat for a fixed distance after the motor for the toggle mechanism is stopped, and the motor for the toggle mechanism is then driven to cause the movable platen to advance for the fixed distance. The retreat of the rear platen and the advance of the movable platen are repeatedly executed until the toggle links stretch to their full length. Thus, the two motors are alternately driven to effect the mold thickness adjustment, so that the proposed apparatus requires a long time for the mold thickness adjustment.

If the toggle links stretch to their full length before the die-touch state is attained, during the mold thickness adjustment, the motor for mold thickness adjustment is driven to advance the rear platen, thereby causing the dies to engage each other, and the same motor is further driven to advance the rear platen further, while causing the toggle links to bend. Then, after the rear platen is retreated for a predetermined period of time, the toggle links are caused to stretch again to their full length. With the toggle links stretched to their full length, the rear platen is advanced for a period of time longer than the predetermined period of time, whereupon the mold thickness adjustment is finished. Thus, in the proposed apparatus described above, the motor for mold thickness adjustment is driven in the die-touch state, during the mold thickness adjustment, so that an overcurrent undesirably flows through this motor.

SUMMARY OF THE INVENTION

The object of the present invention is to provide an automatic mold thickness adjusting method, in which mold thickness adjustment can be effected in a short time by means of a low-cost mold clamping apparatus using a general-purpose motor as a motor for mold thickness adjustment, and an overcurrent can be securely prevented from flowing through the motor for mold thickness adjustment.

In order to achieve the above object, an automatic mold thickness adjusting method according to the present invention, which is applied to a toggle-type mold clamping apparatus including a general-purpose motor for mold thickness adjustment and a servomotor for a toggle mechanism, comprises the steps of: (a) driving a servomotor in a manner such that an output torque of the servomotor is limited, thereby establishing a die-touch state when the toggle mechanism is in an operating position thereof behind an operating position of the toggle mechanism which permits production of a set mold clamping force; and (b) advancing a movable platen by the servomotor, and at the same time, retreating a rear platen by means of the general-purpose motor so that the toggle mechanism takes the operating position for the production of the set mold clamping force, while maintaining the die-touch state.

According to the present invention, as described above, the movable platen is advanced by the servomotor, and at the same time, the rear platen is retreated by the general-purpose motor so that the toggle mechanism takes the operating position for the production of the set mold clamping force, while maintaining the die-touch state which is established when the toggle mechanism is in the operating position thereof behind the operating position of the toggle mechanism which permits the production of the set mold clamping force, by driving the servomotor for the toggle mechanism in a manner such that the output torque is limited. Thus, mold thickness adjustment can be effected in a short time by the low-cost mold clamping apparatus using the general-purpose motor as the motor for mold thickness adjustment, and an overcurrent can be securely prevented from flowing through the motor for mold thickness adjustment.

DESCRIPTION OF THE PREFERRED EMBODIMENTS

Figure 1:
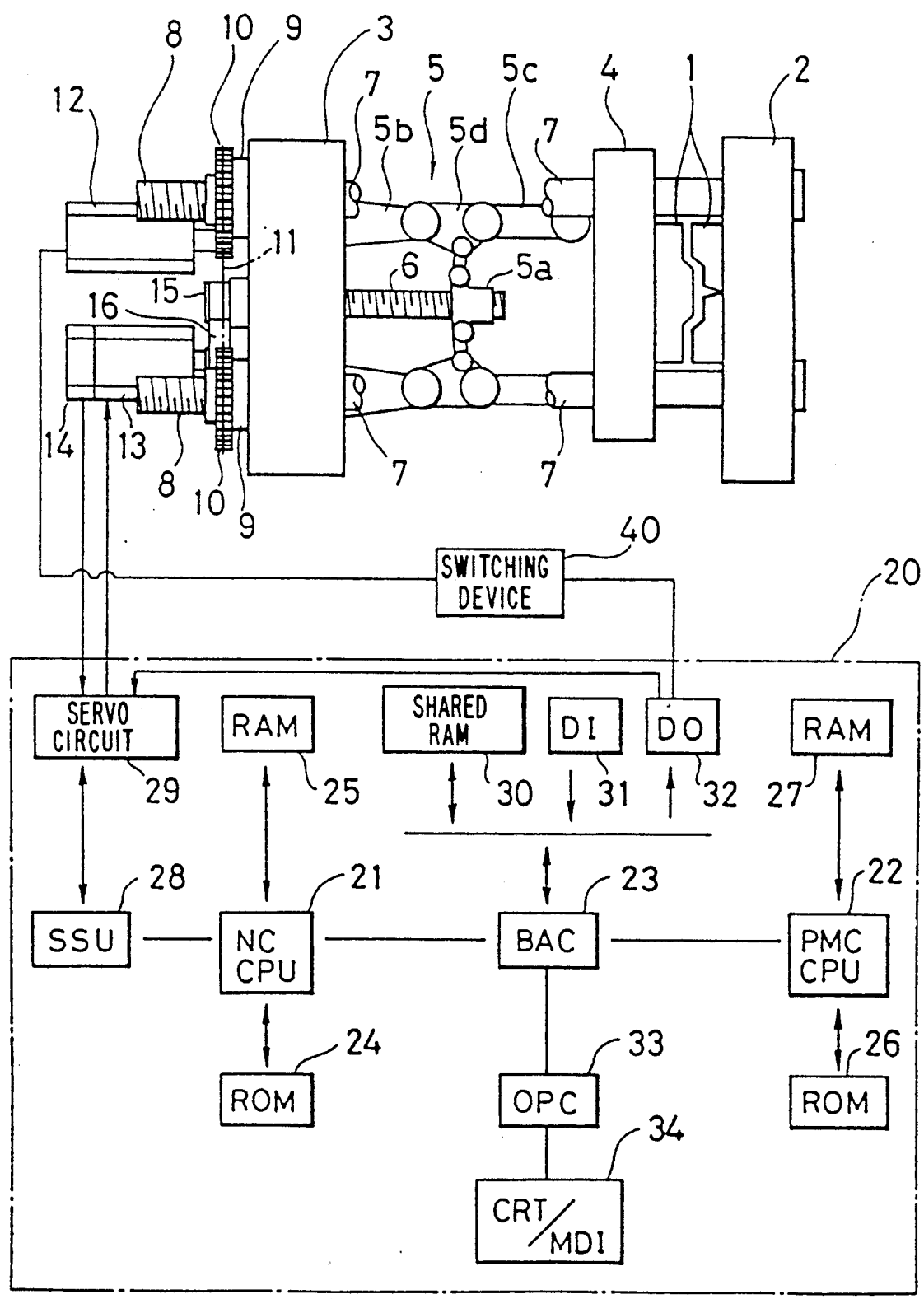
FIG. 1 is a schematic view, partially in a block circuit diagram, showing a mold clamping apparatus to which an automatic mold thickness adjusting method according to one embodiment of the present invention is applied.
Figure 2:
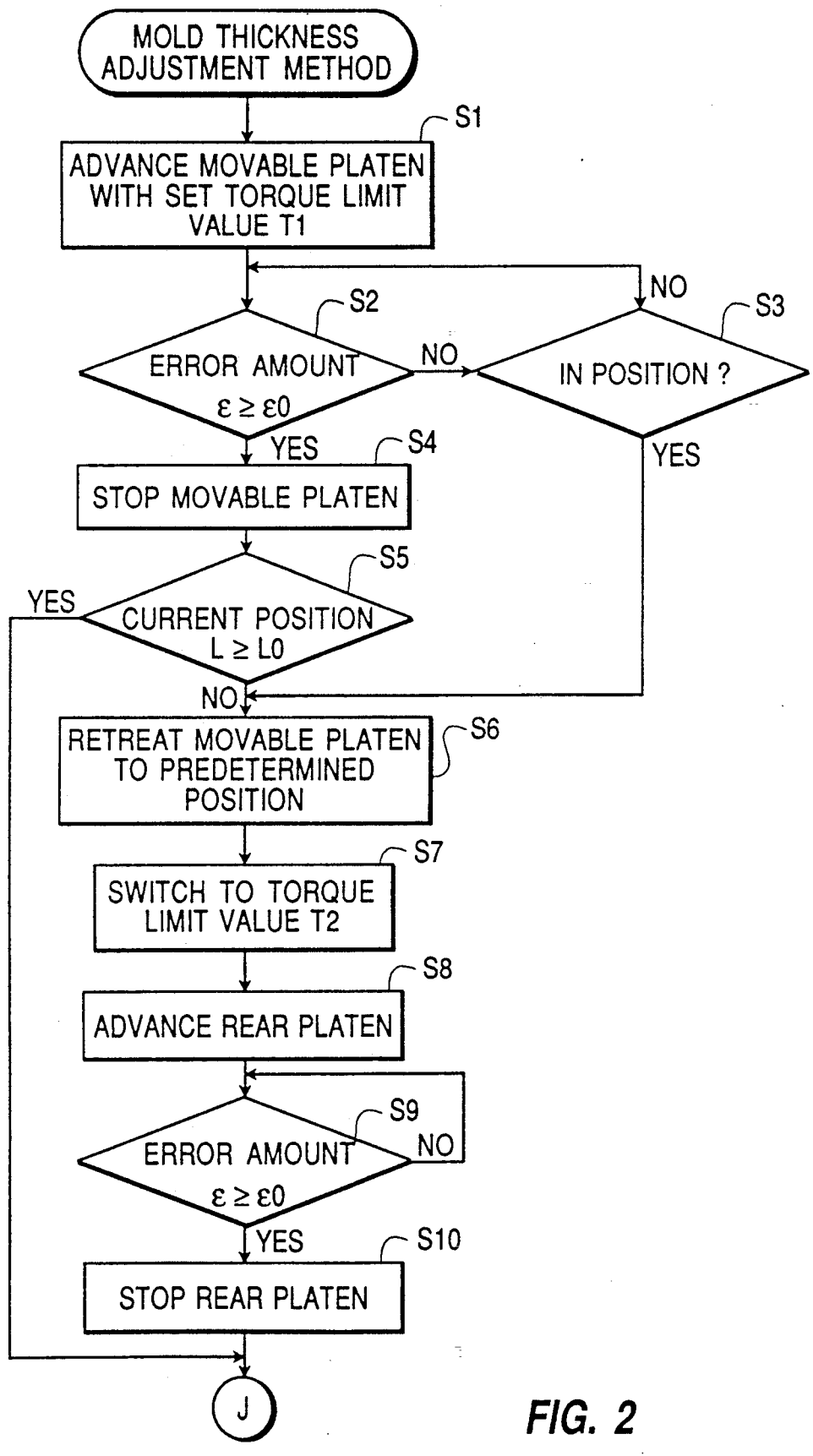
FIG. 2 is a flow chart showing the former half of a mold thickness adjustment method executed by the mold clamping apparatus of FIG. 1.
Figure 3:
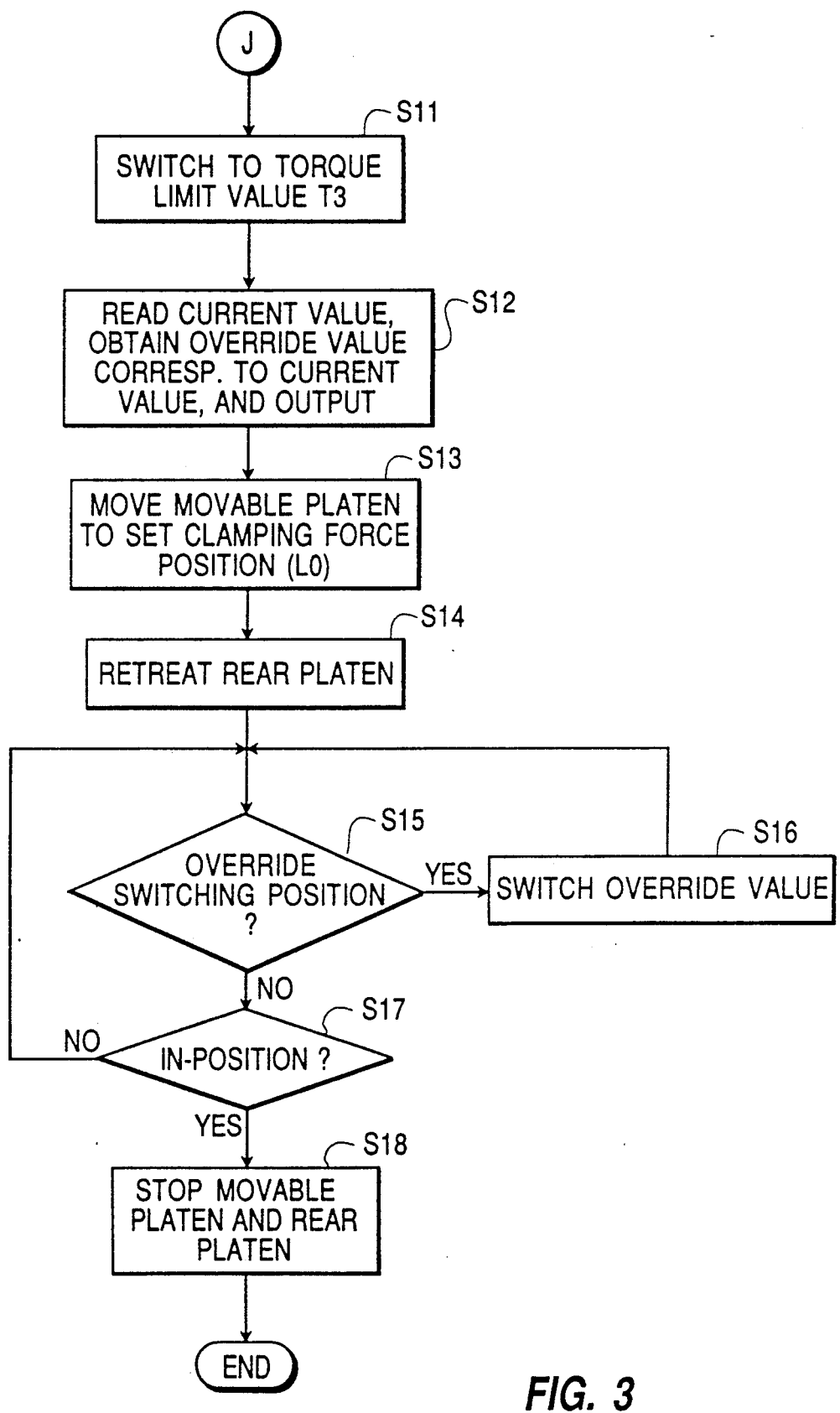
FIG. 3 is a flow chart showing the latter half of the mold thickness adjustment method.

In FIG. 1, an injection-molding machine comprises a stationary platen 2, which is fixed to a base (not shown) of the molding machine and fitted with one die half 1, and a movable platen 4 fitted with the other die half 1. Reference number 3 indicates a rear platen. The platens 2 3 and 4 are connected to each other by means of four tie bars 7. Further, the injection-molding machine comprises a mold clamping apparatus which includes a double-link toggle mechanism 5 formed of a pair of toggle links arranged between the rear platen 3 and a movable platen 4.

Each toggle link of the toggle mechanism 5 is composed of first and second link members 5b and 5c, the outer ends of which are rockably connected to the rear platen 3 and the movable platen 4, respectively, and a third link member 5d, the two opposite ends and an intermediate portion of which are rockably connected to the respective inner ends of the two link members and a crosshead 5a, respectively. A ball nut, which is threadedly engaged with a ball screw 6, is fixed to the crosshead 5a for integral axial movement therewith. The ball screw 6 is rotatably supported by the rear platen 3, and is operatively connected to a servomotor 13 for mold clamping by a timing belt 16, a timing gear 15, etc. Thus, both the toggle links of the toggle mechanism 5 are arranged to bend and stretch when the crosshead 5a reciprocates as the servomotor 13 rotates forwardly and reversely, thereby causing the movable platen 4 to reciprocate along the tie bars 7. The tie bars 7 are arranged to stretch to produce a mold clamping force when the two die halves 1 fitted on the platens 2 and 4 are locked up against each other.

Furthermore, the mold clamping apparatus comprises tie bar nuts 9 which are threadedly engaged with screws 8 formed on those end portions of the tie bars 7 on the side of the rear platen 3. These tie bar nuts 9 are rotatably supported by rear platen 3 so as to be immovable in the axial direction, and are operatively connected to a geared motor 12 for mold thickness adjustment, which is fixed to the rear platen 3, by means of sprockets 10 fixed to the nuts 9 and a chain 11 stretched between the sprockets. The motor 12 is a general-purpose motor, e.g., an induction motor. The rear platen 3 is arranged to reciprocate integrally with the tie bar nuts 9 along the tie bars 7 as the motor 12 for mold thickness adjustment rotates forwardly and reversely.

A numerical control unit (hereinafter referred to as NC) 20 for controlling the injection-molding machine comprises microprocessors (hereinafter referred to as NCCPU and PMCCPU, respectively) 21 and 22 for NC and programmable machine control. The PMCCPU 22 is bus-connected with a ROM 26, which is stored with a sequence program for controlling the sequence operation of the injection-molding machine, a look-up table (mentioned later), etc., and a RAM 27 utilized for temporary storage of data and the like. The NCCPU 21 is connected with a ROM 24, which is stored with a management program for generally controlling the injection-molding machine, and a RAM 25 utilized for temporary storage of data and the like, and is further connected, through a servo interface 28, with servo circuits for controlling the drive of servomotors for various axes for injection, clamping, screw rotation, ejector, etc. (only the servomotor for mold clamping and a servo circuit associated therewith are denoted by numerals 13 and 29, respectively).

A bus arbiter controller (hereinafter referred to as BAC) 23, which is bus-connected to both CPUs 21 and 22, is connected with the respective buses of a nonvolatile shared RAM 30, composed of a bubble memory or CMOS memory, an input circuit 31, and an output circuit 32, and the bus to be used is selected by means of the BAC 23. Further, the BAC 23 is connected with a manual data input device (hereinafter referred to as CRT/MDI) 34 with a CRT display unit through an operator panel controller 33.

The shared RAM 30 includes a memory section for storing an NC program for controlling various operations of the injection-molding machine and the like, a memory section for storing various set values, parameters, and macro variables, and a current value register for renewably storing the current shift position of the crosshead 5a. The input circuit 31 is connected to various sensors (not shown) provided at various parts of the injection-molding machine, while the output circuit 32 is connected to the servo circuits 29 and various actuators (only a switching device including a forward-rotation switch and a reverse-rotation switch and connected to the motor 12 for mold thickness adjustment is denoted by numeral 40) provided at various parts of the injection-molding machine. The position, speed, and output torque of the servomotor 13 are controlled by means of the servo circuit 29 which includes an error register (not shown) adapted to receive a command signal from the NCCPU 21 and an output signal from a pulse encoder 14, attached to the seromotor 13 and adapted to detect the rotational position of the servomotor, and operates in response to those two signals. Also, a torque command value from the servo circuit 29 is limited in accordance with a torque limit value from the PMCCPU 22, so that the output torque of the servomotor 13 is restricted.

Referring now to FIGS. 2 to 7, a method of mold thickness adjustment by the mold clamping apparatus of FIG. 1 will be described.

First, an operator sets various conditions for injection molding, including the mold clamping force, by the CRT/MDI 34. In response to this setting operation, the PMCCPU 22 calculates a crosshead shift position (rotational position of the servomotor 13) LO shown in FIG. 6, which position permits production of the set mold clamping force, and causes the shared RAM 30 to store the calculated value along with the other molding conditions. A coordinate system for representing the shift position of the crosshead 5a is set so that the direction of the rear platen 3 is a positive direction, and various movement commands are given in accordance with this coordinate system.

Then, the PMCCPU 22 reads a mold thickness adjustment program (FIGS. 2 and 3) from the ROM 26 in response to the entry of a mold thickness adjustment command through the CRT/MDI 34, and executes this program. First, the PMCCPU 22 delivers a torque limit value T1, determined beforehand in accordance with the type of the toggle mechanism and the like and stated in the program, to the servo circuit 29 through the BAC 23 and the output circuit 33, and writes a coordinate position (value "0" corresponding to the coordinate origin, in the present embodiment) of a lockup position (FIG. 7) of the crosshead 5a where the toggle links stretch to their full length, in the aforesaid coordinate system, into the shared RAM 30 through the BAC 23. Further, the PMCCPU 22 delivers a lockup position write completion signal to the NCCPU 21.

In response to this signal, the NCCPU 21 distributes pulses to the servo circuit 29 through the servo interface 28 so that the crosshead 5a reaches the lockup position "0." As a result, the servomotor 13 for mold clamping is driven in a manner such that its output torque is restricted to the torque limit value T1. As the motor rotates, at this time, the ball screw 6 rotates, so that the crosshead 5a, which is integral with the ball nut threadedly engaged with the ball screw, advances to the right of FIG. 1. Consequently, the individual toggle links of the toggle mechanism 5 stretch, thereby causing the movable platen 4 to advance (Step S1).

In the meantime, the NCCPU 21 periodically reads an error amount ε, stored in the error register of the servo circuit 29, through the servo interface 28, and writes the error amount into the shared RAM 30. Also, the NCCPU 21 writes a current shift position L of the crosshead 5a corresponding to the current rotational position of the servomotor 13 into the current value register in the shared RAM 30. Further, when pulse distribution up to the lockup position "0" is finished, and therefore, when the crosshead 5a reaches a command shift position (lockup position) or thereabout, thereby entering an in-position width, the NCCPU 21 writes an in-position signal into the shared RAM 30. Meanwhile, the PMCCPU 22 reads the error amount ε from the shared RAM 30 via the BAC 23, and repeatedly determines whether the read amount is not smaller than a predetermined amount ε0 (Step S2), and repeatedly determines whether the in-position signal is written in the shared RAM 30 (Step S3).

If a die-touch state is attained, thereafter, such that the two die halves 1 engage each other, as the movable platen 4 advances before the in-position signal is written, the advance of the platen 4, that is, the rotation of the servomotor 13 entailing an output torque restricted to the torque limit value T1 or less, is prevented. In this case, the supply of the distribution pulses from the NCCPU 21 to the error register is continued, while the supply of a feedback signal from the pulse encoder 14 is stopped, so that the error amount ε increases.

If the PMCCPU 22 determines in Step S2 that the die-touch state is attained, seeing that the error amount ε is not smaller than the predetermined amount ε0, the PMCCPU 22 stops the drive of the servomotor 13, thereby stopping the advance of the movable platen 4 (Step S4). Then, the PMCCPU 22 reads the current crosshead shift position L from the current value register of the shared RAM 30, and determines whether the value L is not smaller than the previously calculated value for the crosshead shift position (position which permits the production of the set mold clamping force) L0 (Step S5). If it is concluded in Step S5 that the value for the current crosshead shift position L is smaller than the calculated value for the position L0, the PMCCPU 22 reverses the servomotor 13 to move back the crosshead 5a to a predetermined shift position behind the calculated position L0 (Step S6). As the crosshead 5a moves backward in this manner, the movable platen 4 retreats, thereby removing the die-touch state.

If the decisions in Steps S2 and S3 are negative and positive, respectively, that is, if the in-position signal is written before the die-touch state is attained, the value for the current crosshead shift position L is equal to the value "0" or thereabout and is smaller than the value L0, so that the program proceeds to Step S6.

Figure 4:
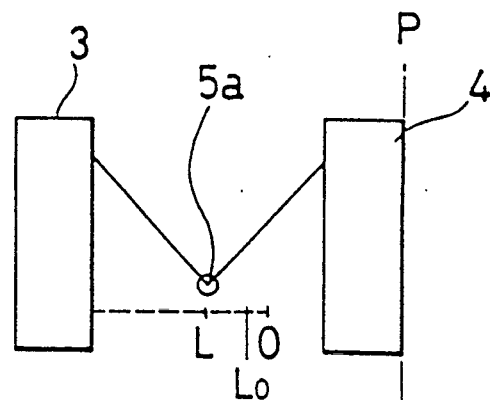
FIG. 4 is a diagram showing shift positions of a movable platen and a crosshead reached at the end of a rear platen stopping method shown in FIG. 2.

Subsequently, after changing the torque limit value to be applied to the servomotor 13 for mold clamping from the torque limit value T1 to a value T2 (Step S7), the PMCCPU 22 turns on the forward-rotation switch of the switching device 40 to rotate the motor 12 for mold thickness adjustment forwardly, thereby causing the rear platen 3 to advance (to the right of FIG. 1) (Step S8). Thereupon, the movable platen 4 advances, and when the die halves 1 engage each other again, the advance of the movable platen 4 is prevented. As the rear platen 3 further advances, therefore, the toggle links are caused to bend gradually, with the servomotor 13 for mold clamping caused to rotate through the ball screw 6 threadedly engaged with the crosshead 5a, and the error amount ε in the error register of the servo circuit 29 increases gradually. Since the torque limit of the value T2 is applied to the servomotor 13, however, an overcurrent can never flow through the motor 12 for mold thickness adjustment. While the rear platen 3 is advancing, the PMCCPU 22 repeatedly determines whether the error amount ε is not smaller than the predetermined amount ε0 (Step S9). When the error amount ε becomes equal to or greater than the predetermined amount ε0, it is concluded that the die-touch state is attained, and the forward rotation of the motor 12 for mold thickness adjustment is stopped, so that the advance of the rear platen 3 is stopped (S10). At this point of time, the movable platen 4 is at a die-touch position P, and the value for the current crosshead shift position L is greater than the value for the position L0 which permits the production of the set mold clamping force (FIG. 4).

Subsequently, after changing the torque limit value to be applied to the servomotor 13 for mold clamping from the torque limit value T2 to a value T3 (Step S11), the PMCCPU 22 causes the rear platen 3 to retreat in the following manner, and at the same time, causes the movable platen 4 to advance at the same speed as the retreating speed of the rear platen. Also if the decision of Step S5 is positive, the following processing is executed.

In order to move the movable platen 4 at a certain constant speed, the moving speed of the crosshead 5a (rotating speed of the servomotor 13) must be changed depending on the state of bending of the toggle links of the toggle mechanism 5 (crosshead shift position). In the present embodiment, therefore, override values V1, V2, ..., and Vn, which correspond to a plurality of crosshead positions (override value switching positions) L1, L2, ..., and Ln, respectively, are tabulated and stored in the ROM 26, and a reference speed of the servomotor 13 specified by the program is corrected by means of an override value read out in accordance with the current shift position of the crosshead 5a.

Figure 5:
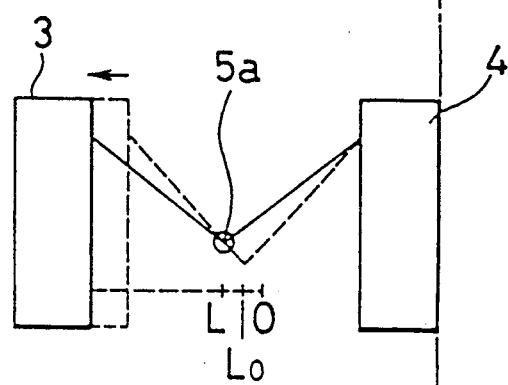
FIG. 5 is a diagram showing shift positions of the movable platen and the rear platen reached during the simultaneous execution of the advance of the movable platen and the retreat of the rear platen shown in FIG. 3.

In Step S12 next to Step S11, the PMCCPU 22 reads out an override value from the look-up table (not shown) in the ROM 26 in accordance with the current shift position of the crosshead 5a read from the current value register of the shared RAM 30, and writes the read value into the shared RAM 30 (Step S12), and then delivers an override value write completion signal. In response to this signal, the NCCPU 21 multiplies the reference speed, specified by the program, by the override value read from the look-up table, thereby calculating a speed equal to a predetermined rear platen retreating speed (mentioned later), and drives the servomotor 13 to a rotational position which corresponds to the position LO for the production of the set mold clamping force, at the calculated speed, thereby causing the movable platen 4 to advance (Step S13). Meanwhile, the PMCCPU 22 turns on the reverse-rotation switch of the switching device 40 to rotate the motor 12 for mold thickness adjustment reversely, thereby causing the rear platen 3 to retreat at the aforesaid predetermined speed (Step S14). As a result, while the advance of the movable platen 4 and the retreat of the rear platen 3 are being executed simultaneously, the movable platen 4 is always kept at the die-touch position P, as shown in FIG. 5.

While both the platens 3 and 4 are moving simultaneously, the PMCCPU 22 repeatedly determines whether the override value switching position is reached by the crosshead 5a, in accordance with the value for the current crosshead shift position periodically read from the current value register of the shared RAM 30 (Step S15), and repeatedly determines whether the in-position signal is written in the shared RAM 30 (Step S17). Every time the next override value switching position Li (i=2, . . . , and n) is reached, moreover, the PMCCPU 22 writes the next override value Vi, read from the look-up table, into the shared RAM 30 (Step S16), in order to use the value Vi for the rotational speed control of the servomotor 13 by means of the NCCPU 21.

Figure 6:
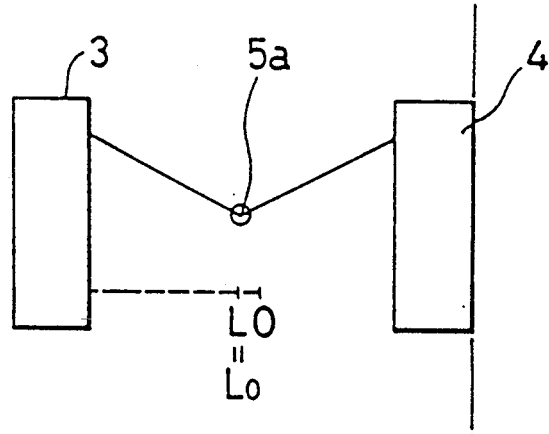
FIG. 6 is a diagram showing the position of the crosshead reached at the end of the mold thickness adjustment method.
Figure 7:
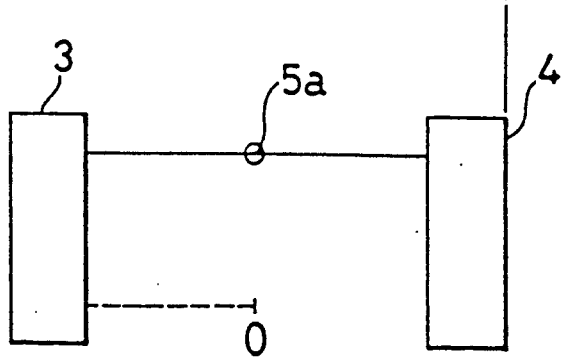
FIG. 7 is a diagram showing a lock-up state in which the crosshead is situated in a lock-up position.

When the crosshead 5a reaches the position LO for the production of the set mold clamping force, thereafter, the NCCPU 21 writes the in-position signal into the shared RAM 30, and stops the drive of the servomotor 13 for mold clamping. If it is concluded in Step S17 that the in-position signal is written, the PMCCPU 22 stops the drive of the motor 12 for mold thickness adjustment. As a result, the advance of the movable platen 4 and the retreat of the rear platen 3 stop simultaneously (Step S18), whereupon the mold thickness adjustment process ends. At this point of time, the crosshead 5a takes the position LO for the production of the set mold clamping force (FIG. 6). Thus, if the servomotor 13 is driven with the aforementioned torque limit removed, during the execution of the injection-molding cycle after the mold thickness adjustment process, the crosshead 5a reaches the lockup position "0" on completion of the mold clamping, as shown in FIG. 7, whereupon the tie bars stretch to their full length, thereby producing the set mold clamping force.

We claim:

1. An automatic mold thickness adjusting method applied to a mold clamping apparatus, which includes a toggle mechanism, a general-purpose motor for mold thickness adjustment and a servomotor for the toggle mechanism, comprising the steps of:
   (a) driving said servomotor, while limiting an output torque of said servomotor, to establish a die-touch state, wherein said toggle mechanism is in a first operating position which permits production of a set mold clamping force; and
   (b) advancing a movable platen by said servomotor, and at the same time, retreating a rear platen by said general-purpose motor, so that said toggle mechanism takes a second operating position for the production of the set mold clamping force, while maintaining said die-touch state.

2. An automatic mold thickness adjusting method for a mold clamping apparatus according to claim 1, wherein said step (a) includes the steps of:
   (a1) determining whether said die-touch state is established;
   (a2) detecting a current shift position of a crosshead of said toggle mechanism; and
   (a3) retreating said crosshead so that the toggle mechanism moves to the first operating position behind said second operating position for the production of the set mold clamping force, when one of said crosshead reaches a lock-up position before said die-touch state is attained and said die-touch state is established in a crosshead shift position before said second operating position for the production of the set mold clamping force, and then advancing said rear platen so that said die-touch state is attained.

3. An automatic mold thickness adjusting method applied to a mold clamping apparatus including a toggle mechanism, a general-purpose motor for mold thickness adjustment and a servomotor for the toggle mechanism, comprising the steps of:
   (a) driving said servomotor while limiting an output torque of said servomotor, to establish a die-touch state wherein said toggle mechanism is in a first operating position which permits production of a set mold clamping force; and
   (b) advancing a movable platen by said servomotor, and at the same time, retreating a rear platen by said general-purpose motor so that said toggle mechanism takes said second operating position for the production of the set mold clamping force, while maintaining said die-touch state,
wherein said step (b) includes steps of:
   (b1) storing beforehand correction factors corresponding individually to a plurality of crosshead shift positions;
   (b2) calculating a speed equal to the retreating speed of said rear platen by multiplying a program-specified reference speed by a correction factor corresponding to the current crosshead shift position; and
   (b3) driving said servomotor at said calculated speed.

4. An automatic mold thickness adjusting method applied to a mold clamping apparatus, which includes a toggle mechanism, a general-purpose motor for mold thickness adjustment and a servomotor for the toggle mechanism, comprising the steps of:
   (a) driving said servomotor, while limiting an output torque of said servomotor, to establish a die-touch state, wherein said toggle mechanism is in a first operating position which permits production of a set mold clamping force,
wherein said step (a) includes the steps of
   (a1) determining whether said die-touch state is established,
   (a2) detecting a current shift position of a crosshead of said toggle mechanism, and
   (a3) retreating said crosshead so that the toggle mechanism moves to the first operating position behind said second operating position for the production of the set mold clamping force, when one of said crosshead reaches a lock-up position before said die-touch state is attained and said die-touch state is established in a crosshead shift position before said second operating position for the production of the set mold clamping force, and then advancing said rear platen so that said die-touch state is attained; and (b) advancing a movable platen by said servomotor and, at the same time, retreating a rear platen by said general-purpose motor so that said toggle mechanism takes said second operating position for the production of the set mold clamping force, while maintaining said die-touch state, wherein said step (b) includes the steps of (b1) storing beforehand correction factors corresponding individually to a plurality of crosshead shift positions, (b2) calculating a speed equal to the retreating speed of said rear platen by multiplying a program-specified reference speed by a correction factor corresponding to the current crosshead shift position, and (b3) driving said servomotor at said calculated speed.

* * * * *